P. N. JONES, F. R. PHILLIPS & J. W. WELSH.
PASSENGER CAR.
APPLICATION FILED JUNE 26, 1912.
1,189,120.
Patented June 27, 1916.
6 SHEETS—SHEET 2.
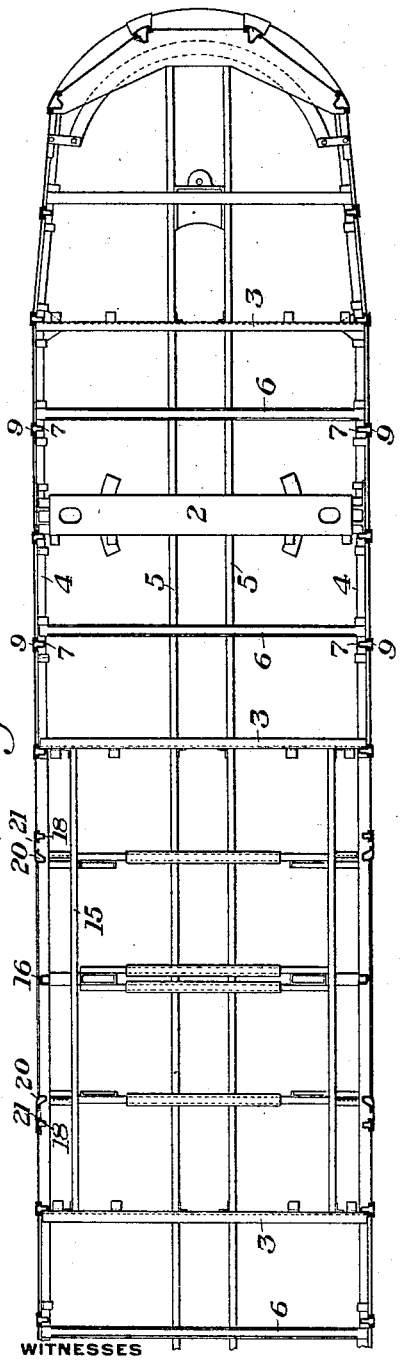
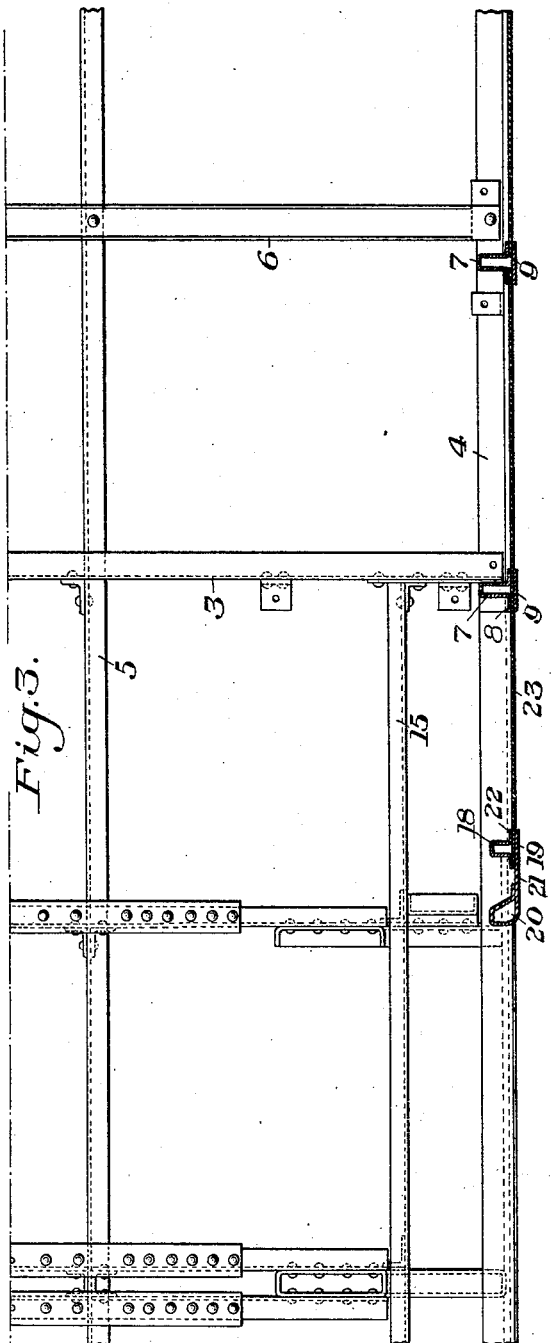

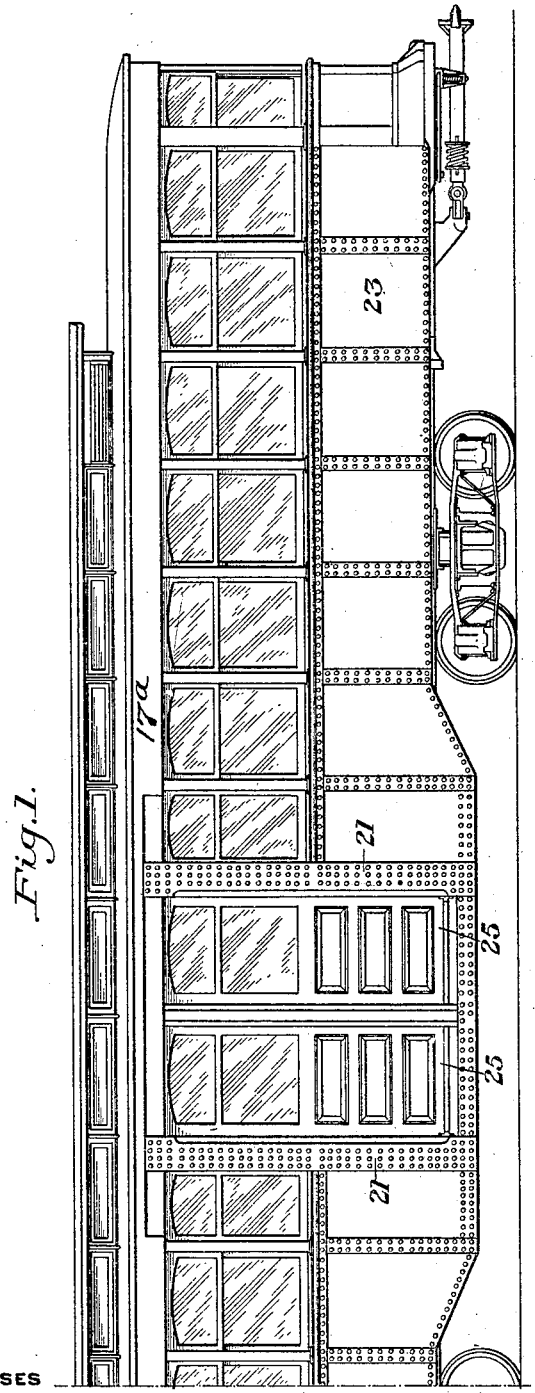

P. N. JONES, F. R. PHILLIPS & J. W. WELSH.
PASSENGER CAR.
APPLICATION FILED JUNE 26, 1912.
1,189,120.  Patented June 27, 1916.
6 SHEETS—SHEET 3.
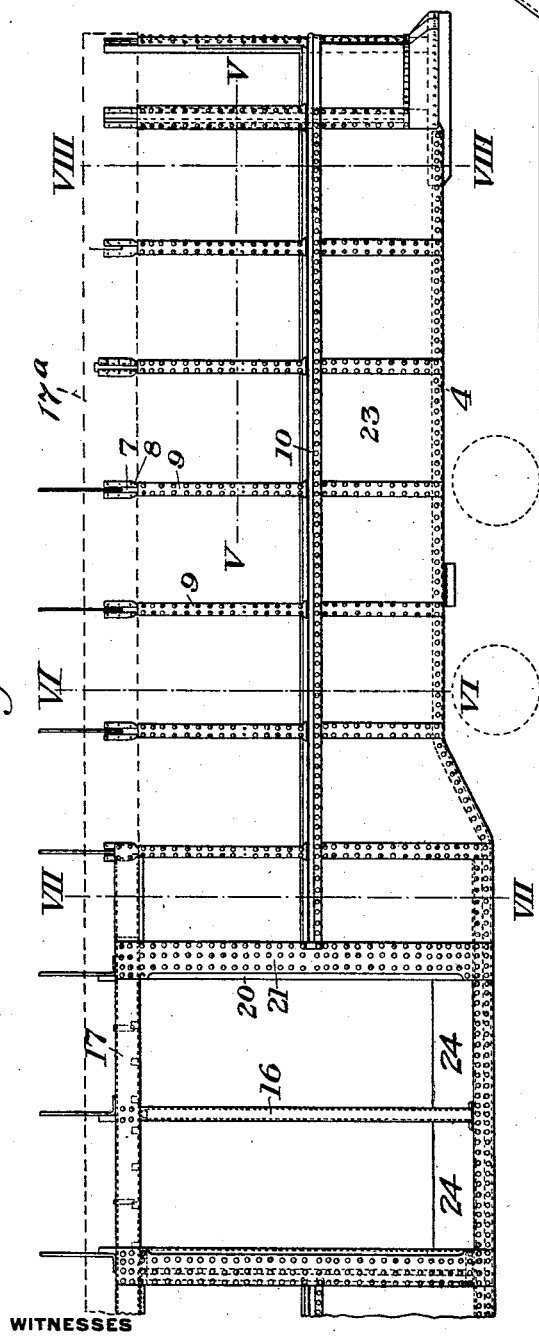
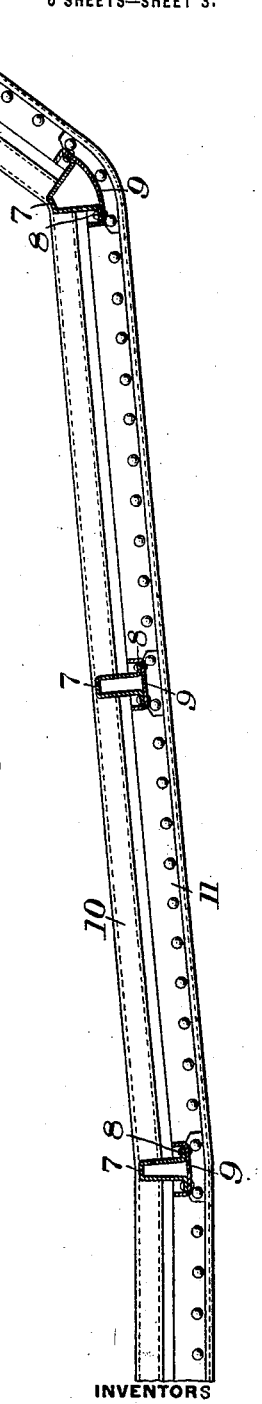

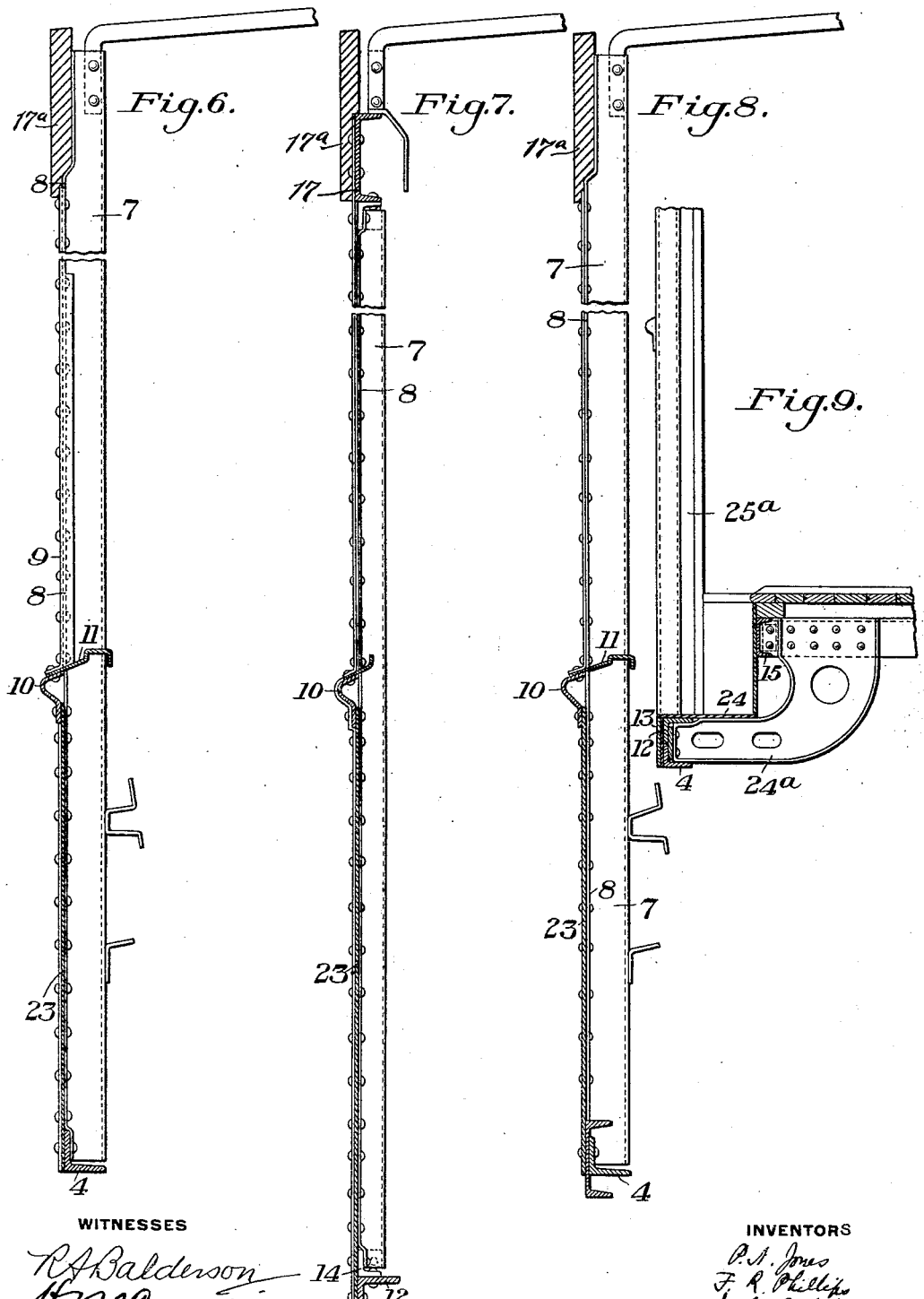

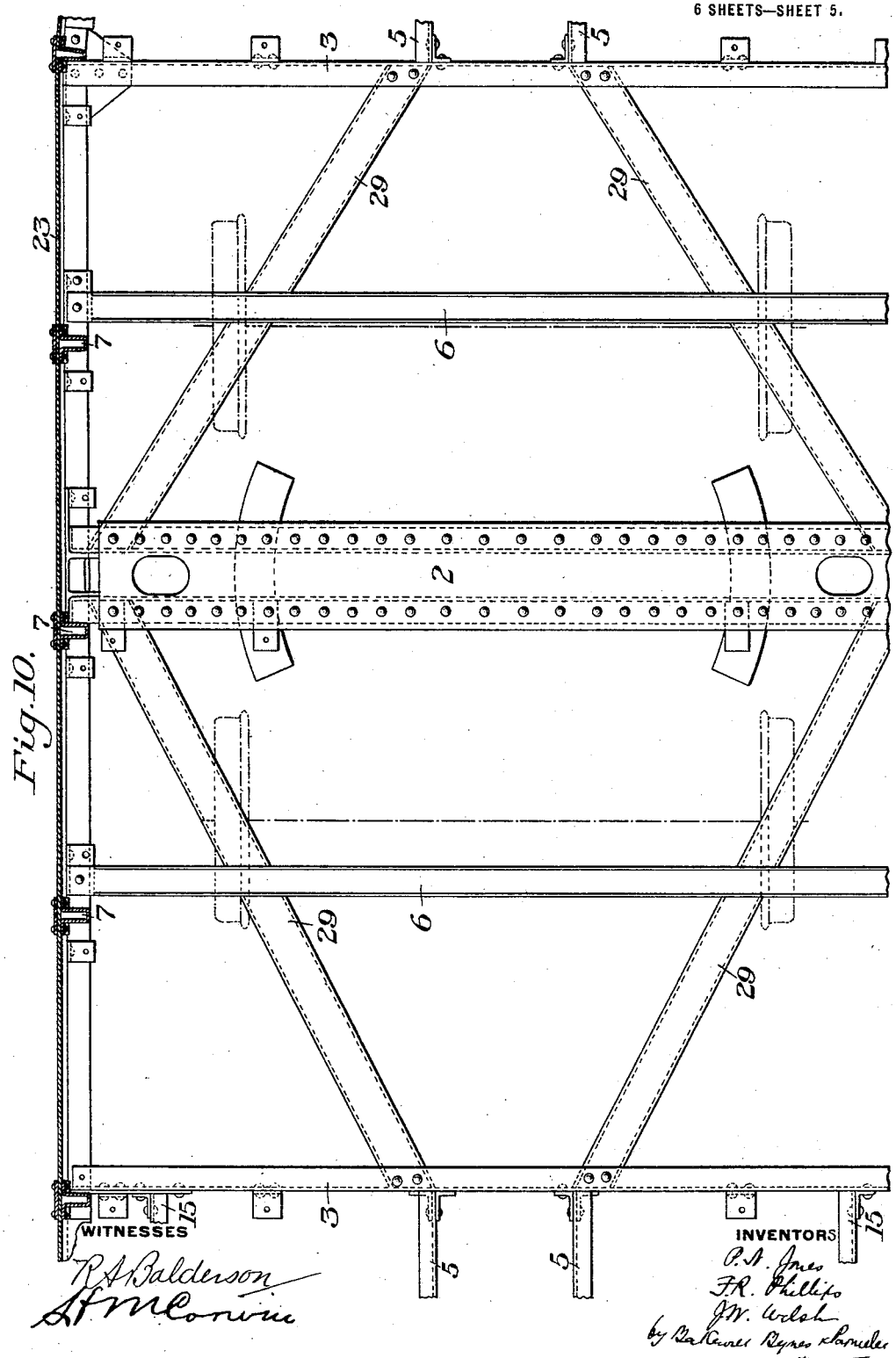

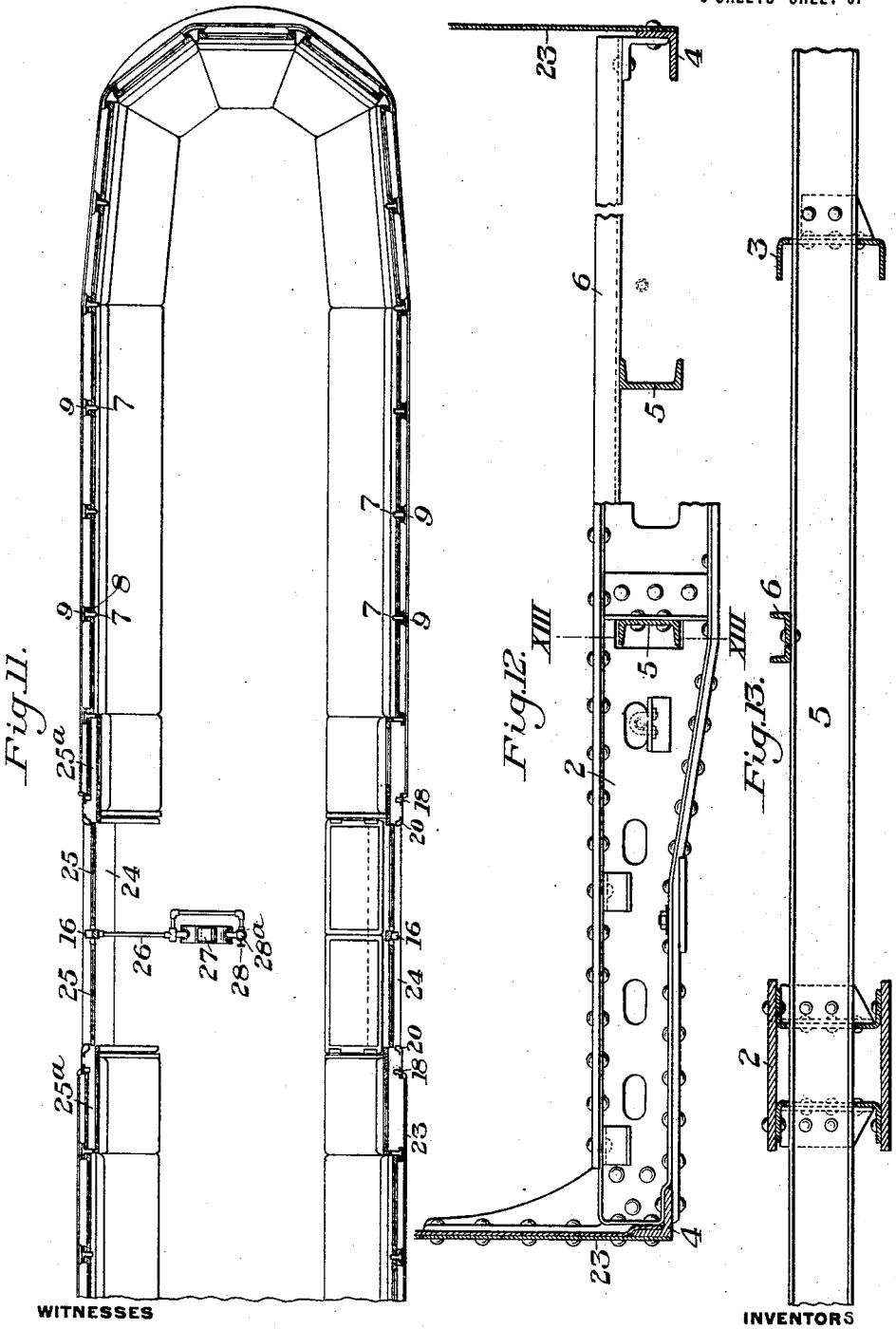

UNITED STATES PATENT OFFICE.

PEARL N. JONES, FRANK R. PHILLIPS, AND JAMES W. WELSH, OF PITTSBURGH, PENNSYLVANIA.

PASSENGER-CAR.

1,189,120.

Specification of Letters Patent.

Patented June 27, 1916.

Application filed June 26, 1912. Serial No. 706,072.

*To all whom it may concern:*

Be it known that we, PEARL N. JONES, FRANK R. PHILLIPS, and JAMES W. WELSH, of Pittsburgh, Allegheny county, Pennsylvania, have invented a new and useful Improvement in Passenger-Cars, of which the following is a full, clear, and exact description, reference being had to the accompanying drawings, forming part of this specification, in which—

Figure 1 is a side elevation of a portion of a car showing one form of our invention; Fig. 2 is a plan view of the floor framing; Fig. 3 is an enlarged plan view of a portion of the floor framing; Fig. 4 is an enlarged view showing a portion of the side framing and sheath; Fig. 5 is a partial longitudinal section on the line V—V of Fig. 4; Figs. 6, 7 and 8 are vertical cross sections on the lines VI—VI, VII—VII, and VIII—VIII, respectively of Fig. 4; Fig. 9 is a detailed view showing step supports; Fig. 10 is a detailed plan view showing a modification of the floor framing arranged for motor cars; Fig. 11 is a partial horizontal section; and Figs. 12 and 13 are detail views of the bolsters and sills.

Our invention relates particularly to the class of passenger cars used on street railways and interurban roads.

The object of the invention is to provide a central, side-entrance passenger car, which shall have the proper strength for resisting the strains to which it is subjected in spite of the wide central openings at each side of the central portion thereof.

Our invention relates particularly to passenger cars where the load is carried by the sides of the car acting as girders. In such structures the middle top portion of the car side above the neutral axis is of course in compression. As the wide door openings are formed in this central portion of the side frame, the strength of the girder is greatly decreased by these openings, which cut away a large portion of this compression member. We have found that by extending the tension member under the drop door openings at the center of the side and by extending the strengthening members over the top of the doorways, we can still give the side sufficient strength to carry the loads to which the car is subjected. Our reinforcing preferably extending over the top of the door takes the place of the continuous belt rail which heretofore formed an important portion of the compression member of the side frame. In our side frame the girder is deepest at the center of the tension member extending under the door opening as the only continuous member below the neutral axis. In the preferred form of our invention, the strength of the compression member is obtained by extending a deck-plate along the upper edge of the car side and over the door opening; this deck-plate being either inside or outside the sheath and carrying substantially the entire compression load for the side of the car.

In our car the belt rail merely acts as a window sill member, the tension strains being taken by the tension member, which is preferably an angle iron extending under the door, while the compression strains are taken by the reinforcing deck-plate extending over the door. In the preferred form of our invention, the bottom tension member is also preferably reinforced by an additional angle under the door openings, and over the door openings, the deck plate is preferably reinforced by a flanged member which may be riveted to the vertical posts.

In the drawings, 2 represents one of the bolsters, and 3, 3 are cross transoms extending transversely from side to side of the car and secured to the continuous angles 4, forming the side sills; 5, 5 are center sill members, which extend through openings in the transoms and bolsters; 6, 6 indicate transverse floor supports, which are intermediate of the transoms and merely act to carry the floor proper. From the continuous angle side sills vertical posts 7 extend upwardly; these posts being preferably formed of plates pressed to the U-shape with outwardly extending flanges 8 thereon. These flanges are preferably riveted to the inner surface of the webs or channels 9, whose flanges project inwardly, and which form carrying plates and give additional strength.

The belt rails at each side of the central door openings are preferably formed of plates 10 bent into trough shape, as shown in Figs. 6, 7 and 8; these being riveted along the sides of the car to form the window sill members. These members have little or nothing to do with carrying the load, although they act as ties for the vertical posts. To them are secured metallic window sills 11.

At the center of the car, the longitudinal angle side sill is bent down to a lower plane and extends continuously under the door opening, and in the lower portion thereof, this angle is reinforced by another angle 12; the two angles being riveted to the wide plate 13, extending under the door and forming a continuation of the sheathing. In this manner these two angles form a deep channel underneath the door opening, and may be further reinforced by a smaller angle 14 riveted to the horizontal leg of the upper angle 12. The frame is further reinforced at this portion by the channel 15, which is inset from the side sill a distance equal to the width of a single step.

The door opening is divided into two parts—an entrance and exit passage—by means of a vertical center post 16; at the sides of the door opening are other vertical posts; these posts together with the center post 16 forming struts between the lower side sill tension member and the upper compression member 17. The posts at the sides of the door opening are preferably of the form shown in Fig. 3, consisting of a member 18, which is similar to the vertical posts 7, before described, and a plate 19 which is bent upon itself to form the hollow portion 20 immediately adjoining the edge of the door opening and the web portion 21, which extends laterally from the opening and is riveted to the outwardly turned flanges 22 of the member 18. This gives a very strong construction of these side posts.

The deck plate reinforcing member 17 may be of any suitable character. We have shown it in the form of a channel, riveted to the vertical posts 7, the side posts 18 and 20 of the door opening, and the center post 16; the said member preferably extending from the post 7 next adjacent to one side of the door opening, and the post 7 next adjacent to the opposite side of said opening.

17$^a$ designates the deck plate members proper (see Figs. 1, 6, 7 and 8 and the dotted line showing in Fig. 4).

By making this reinforcing member 17 of sufficient depth, such as the deep channel form shown, it forms a substantial compression member extending across the top of the door opening, its ends overlapping the end portions of the dividing belt rail, and being connected to the tension member through the vertical posts or struts, as described.

The lower portion of the car sides at each side of the central door opening and below the windows, is preferably a continuous sheathing 23. A single step 24 is inclosed within the doors 25 of the central door opening; this step being shown as supported on cantaliver bracket arms 24$^a$ (see Fig. 9), which are riveted to one of the transoms at their upper ends, and at their lower outer ends are riveted to the angle side sill members and to the reinforcing angle members 12.

By the use of trucks having wheels of relatively small diameter—say 22 inches—the floor of this step may be brought to within easy stepping distance above the street or ground surface, so that the floor level of the car can be easily reached by the use of only one step.

The entrance and exit passages are further separated by dividing rail 26, a fare box 27 being mounted thereon, if desired.

28 is a control valve for the doors, which are preferably sliding doors, sliding into pockets 25$^a$ in the side walls of the car, and which can be operated in any usual way through the medium of the control valve. This valve is preferably mounted on the central post 28$^a$, adjacent to the fare-box or on the central door-post 16, so as to be within convenient reach of the conductor.

The car shown in Figs. 1 to 9, inclusive, is more especially designed for use as a trailer car, but can also be used as a motor car. The only change necessary in the floor framing to adapt it for use as a motor car is that shown in Fig. 10, in which the center sills are cut away at each side of the car bolster to the first cross transom, and these cutaway portions are replaced by oblique channel members 29, which are run from the ends of the bolster obliquely to the junction of the said transoms with the ends on the center sills. These oblique members 29 give sufficient clearance between the wheels and the floor framing for the electrical equipment. Their spread is amply sufficient, so that in service the motors will never swing far enough laterally to contact therewith.

Our invention provides a passenger car of the central side-entrance type, in which the weakening of the car's side due to the formation of the central door openings, is amply compensated for by the reinforcing of the side sill and deck plate members at the central portion in the manner described, whereby a strong and efficient truss construction is provided. This enables the side sills to be dropped to a low point at the center so that the floor level of the car is brought relatively close to the ground or street surface, and may be reached by a single step. In some cases it is possible to drop this floor level to a point where it can be reached without the provision of a step. Where the step is employed it is entirely closed by the doors when the latter are closed, thus giving no foot-hold when the doors are closed and the cars in motion.

The reinforcing of the central portions of the side sills and of the deck plates converts the entire side framing of the car into a deep truss of sufficient strength to carry the load between its point of support and the bolsters, without regard to the belt rails. The cutting away of the latter to form the central door openings is, therefore, immaterial to the strength of the car, and they act merely as sill members for the windows and as ties for the vertical posts of the side framing.

The construction and arrangement of the posts adjacent to the door opening further greatly reinforces the truss construction of the side frames; the posts at each side of said opening act in the nature of queen posts. The floor framing is of strong and simple construction, being composed of angle and channel members of standard form, and which can be readily cut to length and riveted up.

It will be obvious that various changes can be made in the details of construction and arrangement of the several parts. Thus, the details of the floor framing can be changed; the manner of forming the vertical side posts may be varied; the step may be omitted or may be supported in other ways than that shown, and various other changes can be made, all without departing from the spirit and scope of our invention as defined in the appended claims.

We claim:—

1. A passenger car having a side framing formed with a central door opening and having a side sill of angle form, said side sill being depressed at its central portion and extending underneath the door opening, together with another angle member reinforcing the depressed portion of said sill and with said sill forming a channel below said opening, and the car sheathing being extended downwardly and secured to the said channel and connecting the members thereof; substantially as described.

2. A passenger car of the side-door type having its side framing composed of a continuous side sill depressed at its central portion to extend below the door opening, a deck plate member, a series of vertical posts connecting the deck plate member and the side sill, and reinforcing members for both the deck plate and the side sill at the central portions thereof; substantially as described.

3. A passenger car having its side framing formed with a central door opening and having its side sill depressed below said opening, a step at said opening, and cantaliver brackets carried by the floor framing and supporting the step; substantially as described.

4. A passenger car having a side frame comprising a continuous side sill depressed at its central portion and reinforced at its depressed portion, belt rail members divided by the door opening, a horizontal reinforcing deck plate member above the door opening, and vertical posts connecting the side sill deck plate and belt rail members; substantially as described.

5. A passenger car having a side framing formed with a central door opening and having a side sill of angle form, said side sill being depressed at its central portion and extending underneath the door opening, together with another angle member reinforcing the depressed portion of said sill and with said sill forming a channel below said opening, and the car sheathing being extended downwardly and secured to the said channel and connecting the members thereof, together with an additional reinforcing member at said depressed portion above said channel, substantially as described.

In testimony whereof, we have hereunto set our hands.

PEARL N. JONES.
FRANK R. PHILLIPS.
JAMES W. WELSH.

Witnesses:
Geo. K. McGunnegle,
F. W. Ernst.